United States Patent [19]

Cirri et al.

[11] 3,981,071

[45] Sept. 21, 1976

[54] PROCESS OF THERMISTOR MANUFACTURE

[75] Inventors: Gianfranco Cirri; Giovanni Fidanzati, both of Florence, Italy

[73] Assignee: Fabbrica Italiana Magneti Marelli, S.p.A., Milan, Italy

[22] Filed: Mar. 25, 1975

[21] Appl. No.: 561,940

[30] Foreign Application Priority Data

May 17, 1974 Italy .................................. 22856/74

[52] U.S. Cl. .................................. 29/573; 29/576 R

[51] Int. Cl.$^2$ .......................................... B01J 17/00

[58] Field of Search ..................... 29/573, 576, 576 S

[56] References Cited

UNITED STATES PATENTS 3,865,550 2/1975 Bott ...................................... 29/576

*Primary Examiner*—W. Tupman

*Attorney, Agent, or Firm*—Ostrolenk, Faber, Gerb & Soffen

[57] ABSTRACT

A process for the fabrication of thermistors is described. Conductive wires are positioned in a spaced fashion and are aligned so as to intersect one another. The wires are maintained in the above alignment and placed into a reaction chamber or other suitable environment in which chemical vapor deposition of a semiconductor material by a pyrolysis technique is produced. The temperature of the reaction chamber is preferably just below the temperature level needed to produce the vapor deposition. Electric current is preferably passed through the conductors causing them to heat at the region of the intersections to a level sufficient to induce vapor deposition. The semiconductor material is caused to be deposited upon the conductors in the region of the intersection and is continued until the semiconductor material substantially completely surrounds both of the wires in the region of the intersection so as to mechanically and electrically join the wires. The growth is continued until the thermistor of the desired characteristics is developed. Thereafter, two adjacent leads are removed leaving the remaining two leads projecting from the semiconductor material for use in coupling the thermistor to electrical circuits. The process when completed substantially provides a thermistor device which is ready for use without the need for performing additional steps of providing electrical terminations. The nature of the process also lends itself advantageously for producing thermistors on a large mass production scale.

4 Claims, 5 Drawing Figures

PROCESS OF THERMISTOR MANUFACTURE

This invention is concerned with a process of thermistor manufacture with pure or doped semiconductor material.

It is well known that such components are normally provided by using polycrystalline cores formed from a single crystal of semiconductor material, such as germanium, boron, or suitable mixtures of metal oxides, and then applying contacts or electrodes to said cores. Contact application is generally a delicate and difficult operation.

It is the object of the present invention to provide thermistors by a process enabling through a single operation both to deposit pure or doped semiconductor material and to form the electric contacts, so as to obtain finished thermistors for electric connection with external circuits.

According to the invention, this object is achieved by a novel manufacture process essentially grounded on the chemical vapour deposition (pyrolysis) of semiconductor materials.

The process is characterized by comprising the following steps of:

introducing into a suitable environment or reaction chamber at least one pair of electrically conductive filiform elements, as arranged to form at least one intersection, at which such elements have a definite distance;

introducing at vapour state into the reaction chamber a compound of the semiconductor material, from which the thermistor is to be obtained, such as for example a boron or germanium compound, or the like, eventual doping materials and any other required material, or capable of promoting the pyrolysis reaction;

heating the filiform elements so that, only at each of the intersection zones, the temperature will reach at least the minimum rate or value as required for the pyrolysis reaction of the compound, thus causing the deposition of the pure or doped semiconductor material in said intersection zones which are at a higher temperature than that of the remaining lengths of the filiform elements;

controlled growth of the deposit of said material until cores are developed which electrically and mechanically connect the filiform elements at each zone of intersection;

removal of two consecutive branches of the filiform elements projecting from each core and using the remaining two branches as connection terminals of the thermistor.

In a simple preferred embodiment of the invention, heating of the filiform elements is provided by causing an electric current of a suitably controlled intensity to simultaneously or separately flow within the two filiform elements.

Of course, on the ground of the above disclosed informing concept, a plurality of thermistors can be simultaneously provided on industrial mass production scale by arranging in said reaction chamber at least two sets of filiform elements parallel to one another, as lying on two parallel planes at a determined spacing and causing a suitable electric current to flow through the elements to provide for the desired heating at the intersection locations of the elements of said two sets of conductors, so that the deposit of semiconductor material would be caused at every crossing.

The process according to the invention will now be more particularly disclosed in the following description referring only by way of example to some embodiments as shown in the accompanying drawing, in which.

Figure 1:
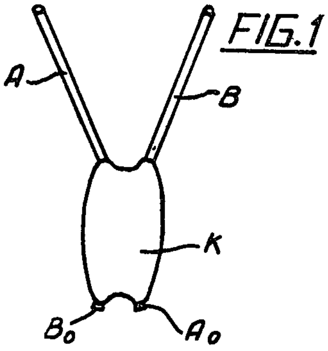
FIG. 1 is a plan view showing a thermistor as provided by the process according to the invention.
Figure 2:
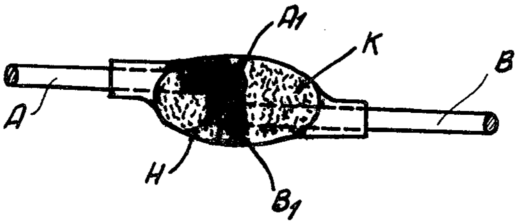
FIG. 2 is an enlarged cross-sectional view of the thermistor shown in FIG. 1.

Referring to FIGS. 1 and 2, a thermistor essentially comprises a body or core K of a pure or doped semiconductor material, two filiform electric conductors A and B projecting therefrom and comprising the terminals for connection with the external circuit.

In FIG. 1, references Ao and Bo denote the ends of conductors A and B, as provided upon cutting the extension of the conductors when the thermistor is completed.

In order to provide a thermistor according to the process of the invention, two bare conductor wires A and B are held in a stationary fashion upon a suitable support, so as to form a predetermined angle therebetween. The wires are maintained at a predetermined spacing H at the nearest locations $A_1$ and $B_1$ thereof, which in the following will be referred to as "intersection locations" or "zones".

The support together with the conductors is then introduced into a reaction chamber, wherein a predetermined atmosphere or environment is developed to provide for pyrolytic deposition of a semiconductor material at the conductor intersection locations. For example, assuming it is desired to provide a core K of boron, and accordingly a boron thermistor, the environment would comprise a chlorine compound and other elements required for the reaction, all of which are at gas or vapour state. Thus, boron trichloride can be used as mixed in suitable proportions with hydrogen.

Then, an electric current is applied to the conductors A and B until reaching, in a small length of the intersection zone of said conductors A and B, that is about locations $A_1$ and $B_1$, a substantially higher temperature than that of the remaining conductor lengths, as a result of mutual heat radiation being exerted by each conductor on the other conductor.

Thus, by adjusting the intensity of the heating current, the temperature at that zone is made to reach a slightly higher level than the minimum required level for the reaction which, where boron is concerned, is as follows:

$$2BCl_3 + 3H_2 \rightarrow 6HCl + 2B$$

Boron is deposited between the two conductors, while HCl leaks out of the reaction chamber.

Of course, the growth of boron deposit is stopped, by cutting off the electric power supply, when between $A_1$ and $B_1$ a core K is built up of a given size and such that the electrical and mechanical connection between the two conductors A and B is assured.

The deposited boron can be doped by introduction into the reaction chamber of a compound of the doping element at the desired concentration. For example, should the doping element comprise carbon, it would be sufficient to admix natural gas or methane to boron trichloride and hydrogen.

When the conductor-core unit has been removed from the reaction chamber, two adjacent conductors are cut adjacent core K, leaving the other two projecting conductors A and B for use as thermistor terminations (FIG. 1).

Core K can then be cladded with a protective coating and the surface of the thermistor terminals can be treated to provide particular characteristics of resistance to oxidation, should the thermistor be used at high temperature in oxidizing environment.

Obviously, the above described process for a thermistor is also valid where mass production of thermistors on industrial scale is concerned.

Figure 3:
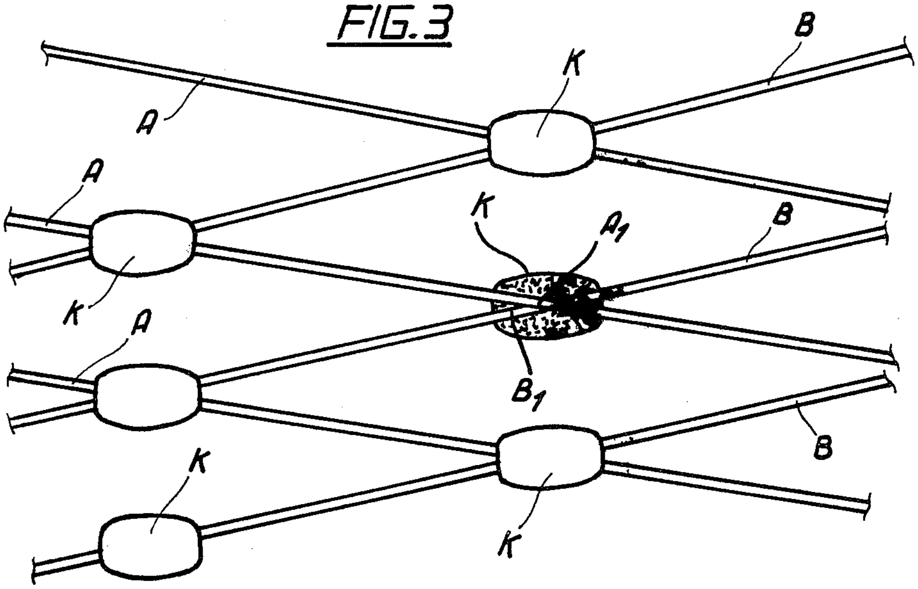
FIG. 3 is a schematic plan view showing the arrangement for a plurality of conductors where a mass production of thermistors is concerned.

In such a case, a plurality of pairs of conductors are introduced into the reaction chamber, with such conductors crossing one another, or advantageously, a plurality of conductor sets or bundles. As shown in FIG. 3, the conductors of one set are arranged parallel to one another, but so as to intersect at the desired distance with the conductors of the set to which they are to be ultimately coupled.

By supplying current to the conductors of the several sets, deposition is simultaneously provided for the semiconductor material at the intersection of the various conductors.

Figure 4:
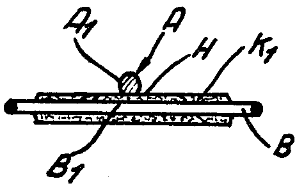
FIGS. 4 and 5 show two steps for a modified embodiment of the process according to the invention.
Figure 5:
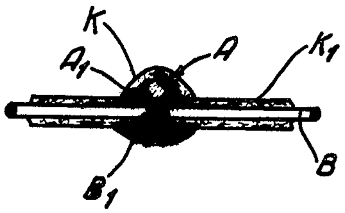

In the modified embodiment shown in FIGS. 4 and 5, only one of the two conductors A and B, such as conductor B, is heated in the environment, in which the atmosphere has been developed as required for providing the desired pyrolytic reaction. Thus, a coating $K_1$ of uniform thickness H is deposited on conductor B (FIG. 4).

Then, the other conductor A is contacted with coating $K_1$ of conductor B, so that the thickness of this coating $K_1$ would comprise the spacer element between A and B at the intersection. Thereinafter, a current of suitable intensity is caused to flow in both of the conductors and this heating, as above discussed, provides for the growth of the core K (FIG. 5). The above described operations are then carried out to thereby provide thermistors which are ready to use.

According to this modified embodiment, thermistors of desired characteristics can be provided, since coating $K_1$ can be made of any suitable material and desired controlled thickness. Moreover, layer $K_1$ can be applied to one of the conductors in any other way.

The provision of thermistors by the above described process is considerably simplified over prior art methods, but essentially the advantage is gained of obtaining thermistors which are already provided with terminations. Furthermore, according to the present invention, the resistive rate of the thermistors can be controlled by controlling the distance or spacing H and accordingly the thickness of the deposit built up at the crossings $A_1$–$B_1$.

In such a case, the mass production of thermistors is simplified and made rational, assuring to such thermistors a constancy (i.e., uniformity) in the characteristics.

Modifications and changes can be made to the above described process, without departing for this from the scope of the invention.

Thus, for example, the zones of localized heating about locations $A_1$–$B_1$ can be provided by restricting the cross-section of conductors A and B at the intersection; or about given parts of the filiform conductors provision can be made for arranging elements made of conductive or insulating material for maintaining such parts colder than the intersection zone.

Finally, as to the conductors to be used, it would be apparent that the conductors should be consistent with the reaction temperatures. Thus, in the case of reacting boron trichloride, reaction occurring at about 800°-900°C, such heat resistant conductors will be used as molybdenum, tungsten and the like.

What is claimed is:

1. A process of producing thermistors from semiconductor materials, the process comprising the steps of:

a. introducing into a reaction environment at least one pair of electrically conductive filiform elements, arranged to form therebetween at least one intersection, the elements being spaced a given distance apart at said intersection;

b. introducing into said reaction environment a compound of the semiconductor material, said compound being in the gaseous state, which semiconductor material is to comprise the desired thermistor, and other material required in the pyrolysis reaction of the compound;

c. individually heating each of the filiform elements so that the heat generated by each element is insufficient to induce a prylosis reaction while the heat generated by the elements in the region of the intersection is collectively sufficient to reach, only at each of the intersections, at least the minimum temperature required for a pyrolysis reaction, whereby a concentrated deposit of the semiconductor material is formed only at the intersection zones due to the pyrolysis reaction;

d. allowing the deposit of said material to grow until cores electrically and mechanically connecting the filiform elements at each intersection zones are formed;

e. removing two adjacent branches of the filiform elements projecting from each of the cores and using the remaining two branches as connection terminals of the thermistor.

2. A process as set forth in claim 1, wherein step (a) further comprises the steps of preliminarly providing on one of the conductive filiform elements a layer ($K_1$) of the semiconductor material having a predetermined thickness; then bringing the other conductive filiform element into contact with this layer, whereby semiconductor material is ultimately deposited on said two conductive elements at the intersection ($A_1$–$B_1$) thereof.

3. A process as set forth in claim 1 wherein step (a) further comprises the step of providing a plurality of pairs of conductors formed of at least two opposing sets of conductors which are suitably individually heated to provide for a concentrated deposit of the semiconductor material only at the intersections of the parallel conductors of one set with the parallel conductors of the other set, to which they are coupled.

4. A process as set forth in claim 1, wherein the conductor heating step is accomplished by the step of passing an electric current through at least one of said conductors.

* * * * *